J. M. MOTT.
Lightning-Rods.
No. 152,242. Patented June 23, 1874.
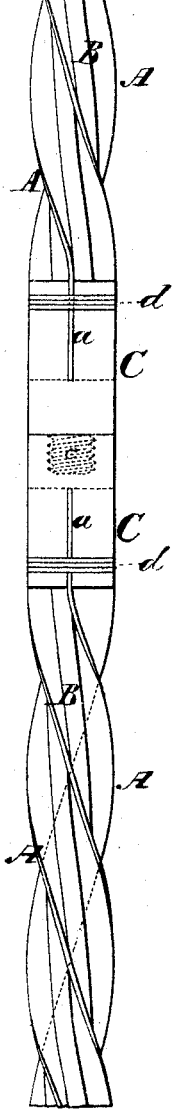
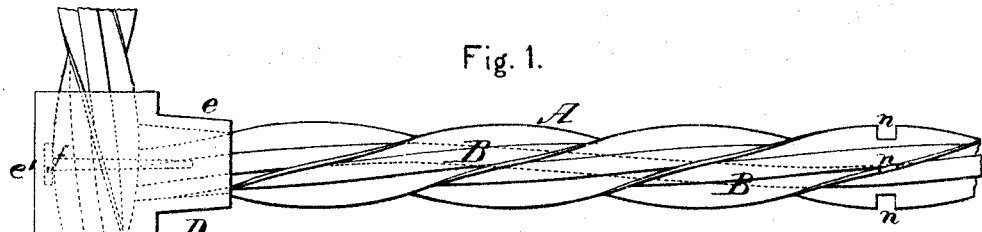
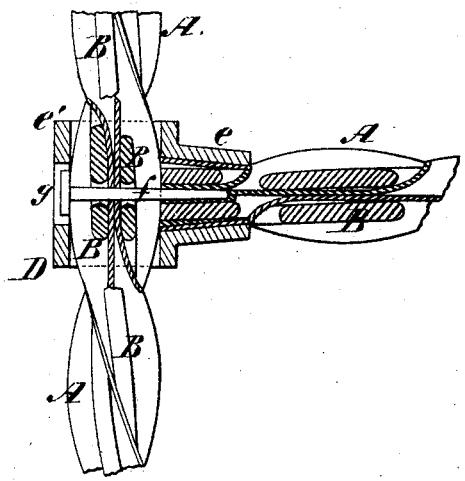
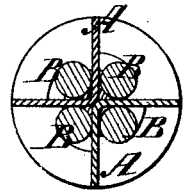
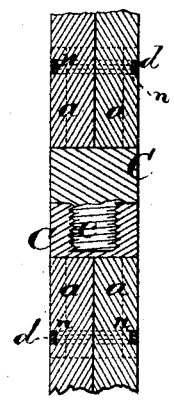
WITNESSES.
Villette Anderson.
E. H. Bates.
INVENTOR.
John M. Mott,

UNITED STATES PATENT OFFICE.

JOHN M. MOTT, OF CHICAGO, ILLINOIS.

IMPROVEMENT IN LIGHTNING-RODS.

Specification forming part of Letters Patent No. 152,242, dated June 23, 1874; application filed November 8, 1873.

*To all whom it may concern:*

Be it known that I, JOHN M. MOTT, of Chicago, in the county of Cook and State of Illinois, have invented a new and valuable Improvement in Lightning-Rods; and I do hereby declare that the following is a full, clear, and exact description of the construction and operation of the same, reference being had to the annexed drawings, making a part of this specification, and to the letters and figures of reference marked thereon.

Figure 1 of the drawings is a representation of my lightning-rod as arranged. Figs. 2, 3, and 4 are sectional views of the same.

This invention has relation to couplings for lightning-rods which are composed of flanges and rods twisted together. The nature of my invention consists in a screw-coupling, into which the ends of the flanged portions of the rods are secured by means of wire wrapping and solder. It also consists in securing the rod-sections together at right angles to each other by means of a T-shaped coupling and a key, which latter is driven through one rod and into the end of another at right angles to it, so as to spread out the end into a tapered socket, as will be hereinafter explained.

The following is a description of my improvements: The rod for which my improved couplings are intended consists of thin metal flanges A A and galvanized-iron rods B, which latter are arranged in the angles of the flanges, and designed for giving great strength and stiffness to the rod. The flanges are preferably formed from strips of copper, which are drawn between rollers, and bent at right angles, as shown in Fig. 4. Two of these angular strips are brought together, so that their angles touch, and after adjusting the rods B in their places the whole are twisted together, as shown in the drawings, thus forming a rod which presents a large conducting-surface, and which is very light and strong. C C represent the two cylindrical parts of a line-coupling, which parts are united by a male and female screw, c, or in any other suitable manner. Each part C of this coupling has kerfs sawed into it at right angles to each other, and of such size as will receive one inch, more or less, of the flanges A A. The ends of these parts C C are also bored out or cast hollow, and receive the ends of the rods B.

For the purpose of permanently and rigidly securing the coupling-sections C C to the lightning-rods, annular grooves are made into the sections, and notches *n* are cut into the flanges A, corresponding to said grooves. Wire *d* is then wound in the grooves and notches, after which all the joints are filled with solder, thereby making a complete metallic connection of the sections C C to the rods.

Whenever it is desired to unite a branch rod to the main ground-rod at any angle thereto, I employ a T-shaped coupling, D, consisting of two short tubes, *e e'*, cast of one piece, at right angles to each other. The interior of the tube *e* is tapered, so as to flare inward, but the bore of the tube *e'* is cylindrical. Directly opposite the tube *e* a hole, *g*, is made, through the tube *e'*, for the insertion of a key, *f*, which key is inserted through the center of the ground-rod, and driven into the end of the branch rod, as shown in Fig. 2. I thus secure the ground-rod into the coupling D, and at the same time, and by the same key, spread out the end of the branch rod into its tube *e*, and secure it firmly therein.

If desired, the coupling D may be filled up with solder after it is secured to the rods, for the purpose of making a still more perfect metallic connection, although I do not consider this absolutely necessary.

What I claim as new, and desire to secure by Letters Patent, is—

1. The flanges A and rods B, inserted into tubular and slitted ends of coupling-sections C C, and secured therein by wire wrapping *d* and solder, as and for the purposes described.

2. The T-coupling D, perforated at *g*, and having a tapered tube, *e'*, to receive the branch rod, in combination with the wedge *f*, as and for the purposes described.

In testimony that I claim the above I have hereunto subscribed my name in the presence of two witnesses.

JOHN M. MOTT.

Witnesses:
GEORGE E. UPHAM,
JOS. B. LOOMIS.